April 15, 1924.
E. C. WALDORF
POLICEMAN'S CLUB
Filed March 24, 1922
1,490,651
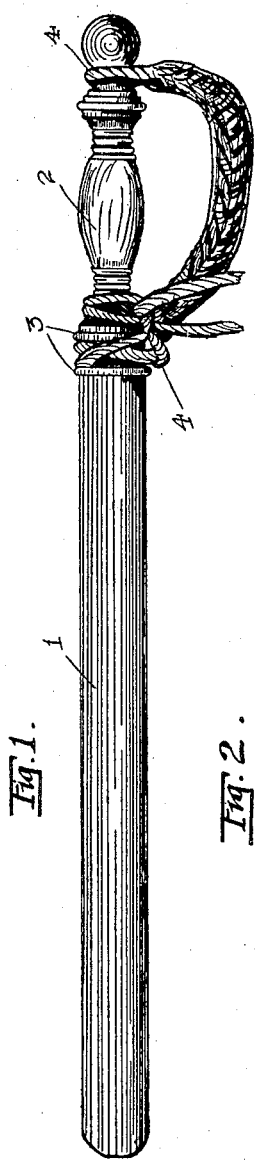
Fig.1.
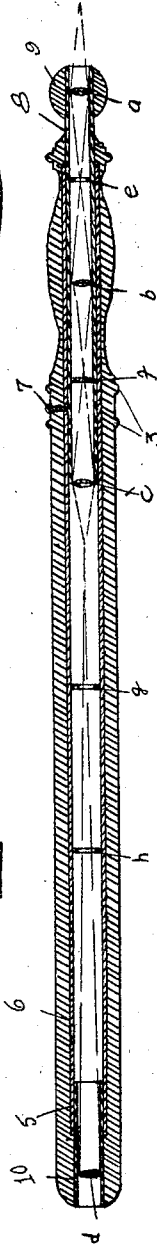
Fig.2.
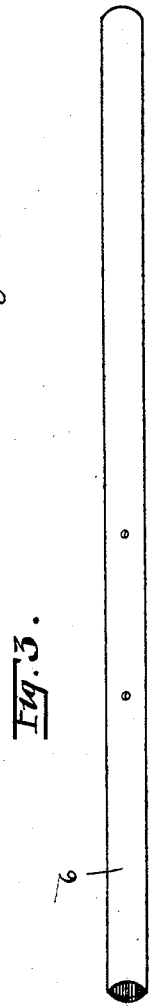
Fig.3.
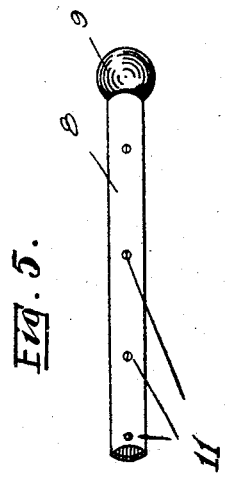
Fig.5.
Fig.6.
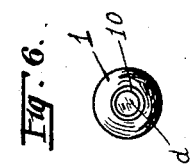
Fig.4.
Inventor
Eugene C. Waldorf
By George A. Prévost
Attorney Patented Apr. 15, 1924.

1,490,651

UNITED STATES PATENT OFFICE.

EUGENE C. WALDORF, OF BUFFALO, NEW YORK.

POLICEMAN'S CLUB.

Application filed March 24, 1922. Serial No. 546,356.

*To all whom it may concern:*

Be it known that I, EUGENE C. WALDORF, a citizen of the United States, residing at Buffalo, in the county of Erie and State of New York, have invented certain new and useful Improvements in Policemen's Clubs; and I do hereby declare the following to be a full, clear, and exact description of the invention, such as will enable others skilled in the art to which it appertains to make and use the same.

My invention relates to improvements in police clubs or billies, and has for its object to provide a club or billy having a telescope of fairly good power, inserted therein. This arrangement will enable a traffic officer to identify license plates on a moving vehicle, or features of suspected violators of the law at a distance impossible of detection by the unassisted eye.

The combination is arranged in such a manner, that it in no way interferes with the usual function of the club, nor does it change its outward appearance.

With the above and other objects in view which will appear as the description proceeds, my invention consists in the novel features herein set forth, illustrated in the accompanying drawing and more particularly pointed out in the appended claims.

In the drawing,

Fig. 1 is perspective view of my improved police club, which has the same outward appearance as those at present in use.

Fig. 2 is a cross sectional view of Fig. 1 showing the tube, lenses and diaphragms in place in the club.

Fig. 3 is a view of the tube.

Fig. 4 shows the objective, and

Fig. 5 the eye piece.

Fig. 6 is an end view of the club, showing the tube in the center.

Similar reference characters designate identical parts throughout the several views.

1 represents the body of the club, which as heretofore stated, is the same in appearance as an ordinary police club or billy, being provided with a handle 2, and a beaded portion 3 to receive the cord 4.

This club is hollowed out longitudinally thereof as shown at 5 and a tube 6 is inserted therein, which extends to within a short distance from each end, and is secured in place by means of a set screw 7, which passes through the club at 3 and into the tube, being hidden from view by means of the cord 4.

In the handle end of the club, I place an eye piece 8, which is smaller in diameter than the tube 6, and is inserted for a portion of its length in one end thereof. To the other end of the eye piece I secure a spherical portion 9 which is adapted to hold the other end of the cord in place.

At the end of the club opposite the handle, I provide an objective 10, which is the same diameter as the eye piece and is also inserted part way in the tube.

The telescope consists preferably of four lenses $a$, $b$, $c$ and $d$. The eye piece contains $a$, $b$ and $c$, and the objective contains the lens $d$. The lenses in the eye piece are preferably about one and one-eighth inches focus each, and are placed apart about twice the distance of their focal length, so that the rays of light from each, cross midway between any two of the lenses.

These lenses are held in place by means of small screws 11, shown in Figs. 3, 4 and 5.

Spaced apart between the lenses, I provide diaphragms, composed of sheet metal or rubber discs or other suitable material, which are placed near or at the points where the light rays cross. Each diaphragm has an aperture the size of which depends on how much extraneous light it is desired to exclude.

In my preferred form, I provide the diaphragm $e$ with an aperture of about thirteen thirty-seconds of an inch, while diaphragm $f$ has an aperture of about three thirty-seconds of an inch, because of the fact that there is an excess of extraneous light at that point, giving a milky appearance to the field of vision unless the aperture in the diaphragm is small. The diaphragm $g$ is preferably provided with a three-eighths of an inch hole and $h$ has an opening about one-fourth of an inch in diameter.

The lines from the lenses, shown in Fig. 2, represent rays of light passing from the object lens through the lenses and to the eye of the observer.

These diaphragms are also held in place by screws 11, in the tube.

The telescope is focussed to the desired degree and placed in the club and secured by the set screw. The device is dust proof and need not be taken apart and cleaned, but the outer surface of the end lenses may be wiped off occasionally with a piece of cloth or cotton on a match or small stick.

The use of my device is obvious, and it is believed that from the foregoing the invention will be clearly understood without further description.

It is also obvious that numerous changes may be made in the details of construction without departing from the spirit of the invention.

For example, a two lens telescope as exemplified in the ordinary opera glass, or the four lens eye-piece of the common telescope, may be used.

The inner tube may also be dispensed with by boring a hole in the club the same size as the sectional tubing, securing each lens in position by means of screws inserted through the wall of the club.

What I claim and desire to secure by Letters Patent is:—

1. As an article of manufacture, a telescope provided with a casing of a shape, material and thickness suitable to enable it to be used as a policeman's club.

2. As an article of manufacture, a telescope provided with a casing of a shape, material and thickness suitable to enable it to be used as a policeman's club, the ends of said device being unobstructed at all times.

3. An article of manufacture as claimed in claim 1, in which the device is so arranged that a blow may be struck therewith, and the lenses remain intact and operative.

4. An article of manufacture as claimed in claim 1, comprising a tube containing a plurality of diaphragms, an eye piece containing a plurality of lenses spaced apart mounted in one end of said tube and an objective inserted in the other end of said tube, means for securing said lenses, diaphragms and tube in place, said device being so arranged that a blow may be struck therewith and the lenses remain intact and operative.

In testimony whereof I affix my signature.

EUGENE C. WALDORF.